(12) United States Patent
Yoshigae

(10) Patent No.: US 11,351,734 B2
(45) Date of Patent: Jun. 7, 2022

(54) MANUFACTURING DEVICE, MANUFACTURING SYSTEM, AND CORRECTION METHOD

(71) Applicant: Takahisa Yoshigae, Kanagawa (JP)

(72) Inventor: Takahisa Yoshigae, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 186 days.

(21) Appl. No.: 16/801,307

(22) Filed: Feb. 26, 2020

(65) Prior Publication Data

US 2020/0282656 A1 Sep. 10, 2020

(30) Foreign Application Priority Data

Mar. 4, 2019 (JP) .............................. JP2019-038482
Apr. 19, 2019 (JP) .............................. JP2019-079984

(51) Int. Cl.
| | |
|---|---|
| *B29C 64/393* | (2017.01) |
| *B29C 64/118* | (2017.01) |
| *B29C 64/268* | (2017.01) |
| *G01B 11/24* | (2006.01) |
| *B33Y 80/00* | (2015.01) |

(52) U.S. Cl.
CPC .......... *B29C 64/393* (2017.08); *B29C 64/118* (2017.08); *B29C 64/268* (2017.08); *G01B 11/24* (2013.01); *B33Y 80/00* (2014.12)

(58) Field of Classification Search
CPC ... B29C 64/393; B29C 64/118; B29C 64/268; G01B 11/24; B33Y 80/00
See application file for complete search history.

(56) References Cited

U.S. PATENT DOCUMENTS

| | | |
|---|---|---|
| 2012/0105903 A1 | 5/2012 | Pettis |
| 2015/0024233 A1 | 1/2015 | Gunther |
| 2017/0292922 A1 | 10/2017 | Woods et al. |
| 2018/0297115 A1* | 10/2018 | Diwinsky .............. B33Y 50/02 |
| 2018/0345577 A1 | 12/2018 | Takeyama et al. |
| 2019/0255765 A1 | 8/2019 | Takeyama et al. |
| 2019/0255766 A1 | 8/2019 | Takeyama et al. |
| 2019/0275742 A1 | 9/2019 | Yorozu |
| 2019/0286104 A1 | 9/2019 | Sugawara et al. |
| 2020/0230886 A1 | 7/2020 | Takano et al. |

FOREIGN PATENT DOCUMENTS

| | | |
|---|---|---|
| EP | 3398701 A2 | 11/2018 |
| JP | 2017-094616 | 6/2017 |
| JP | 2018-047606 | 3/2018 |

(Continued)

OTHER PUBLICATIONS

Extended European Search Report dated Jul. 16, 2020.

*Primary Examiner* — Jamil Ahmed
(74) *Attorney, Agent, or Firm* — Harness, Dickey & Pierce, P.L.C.

(57) ABSTRACT

A manufacturing device manufactures a stereoscopic object on the basis of manufacture information. The manufacturing device includes an output configured to display a given pattern on a stereoscopic object during manufacturing, an imager configured to generate an image of the stereoscopic object on which the given pattern is displayed; and a corrector configured to correct the manufacture information in accordance with shape information of the stereoscopic object based on the generated image.

18 Claims, 16 Drawing Sheets

(56) References Cited

FOREIGN PATENT DOCUMENTS

| JP | 2018-048895   | 3/2018 |
| JP | 2018-079580   | 5/2018 |
| JP | 2019-155606   | 9/2019 |
| JP | 2020-114630 A | 7/2020 |
| JP | 2020-138535 A | 9/2020 |

* cited by examiner

FIG.18A
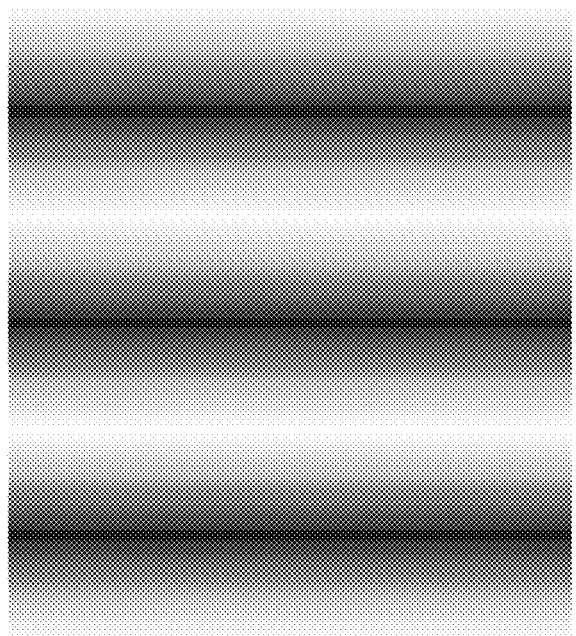
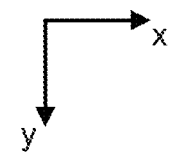
FIG.18B
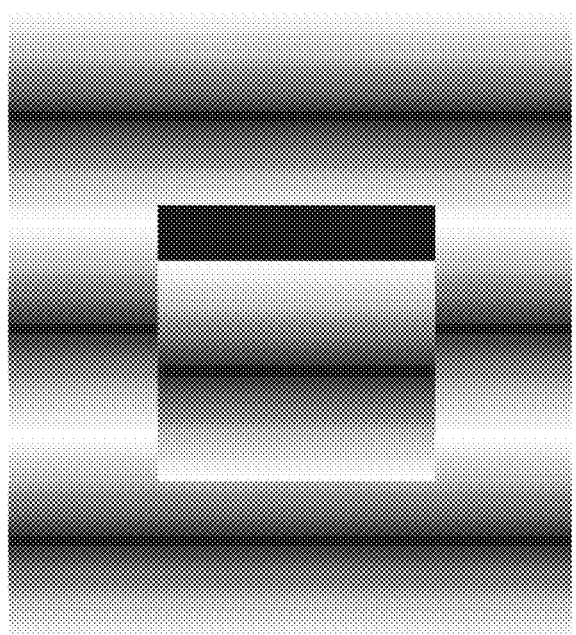
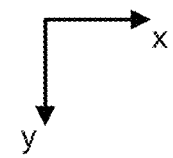

MANUFACTURING DEVICE, MANUFACTURING SYSTEM, AND CORRECTION METHOD

CROSS-REFERENCE TO RELATED APPLICATIONS

The present application claims priority under 35 U.S.C. § 119 to Japanese Patent Application No. 2019-038482, filed on Mar. 4, 2019 and Japanese Patent Application No. 2019-079984, filed on Apr. 19, 2019. The contents of which are incorporated herein by reference in their entirety.

BACKGROUND OF THE INVENTION

1. Field of the Invention

The present invention relates to a manufacturing device; a manufacturing system; and a correction method.

2. Description of the Related Art

A manufacturing device manufactures a stereoscopic object by adding a layer upon a layer of a material. Such a manufacturing device may lower in manufacturing accuracy due to unintended control attributed to external factors such as temporal deformation arising from the property of material or vibrations during manufacturing, which may result in failing to manufacture a desired object.

In this regard, a technique is proposed, which includes illuminating an object with near infrared rays to generate a two-dimensional image from the resultant reflected light with an image sensor; detecting any defect in material layout from two-dimensional information of image information; and rearranging the material in the layer from which the defect is detected (for example, refer to Japanese Unexamined Patent Application Publication No. 2018-079580).

SUMMARY OF THE INVENTION

According to one aspect of the present invention, a manufacturing device manufactures a stereoscopic object on the basis of manufacture information. The manufacturing device includes an output configured to display a given pattern on a stereoscopic object during manufacturing, an imager configured to generate an image of the stereoscopic object on which the given pattern is displayed, and a corrector configured to correct the manufacture information in accordance with shape information of the stereoscopic object based on the generated image.

BRIEF DESCRIPTION OF THE DRAWINGS

FIGS. 18A and 18B are diagrams illustrating exemplary image data generated by pattern projection;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
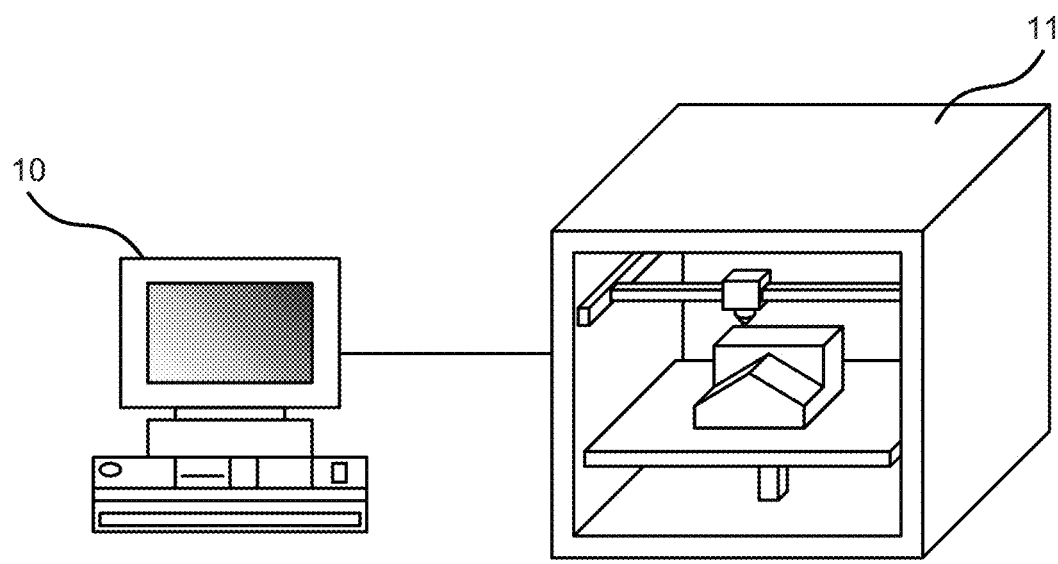
FIG. 1 is a diagram illustrating an exemplary configuration of a manufacturing system.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

It is an object of the present invention to provide a manufacturing device, a manufacturing system, and a correct ion method that enable improvement in accuracy and efficiency of stereoscopic-object manufacturing.

FIG. 1 is a diagram illustrating an exemplary configuration of a manufacturing system including a manufacturing device for manufacturing stereoscopic objects. The manufacturing system includes an information processing device 10 such as a personal computer (PC), and a manufacturing device 11 connected to the information processing device 10 in a wired manner or a wireless manner. The information processing device 10 and the manufacturing device 11 can be connected to each other via one or more networks.

The information processing device 10 transmits, to the manufacturing device 11, three-dimensional information or 3D data representing a three-dimensional shape of a stereoscopic object, such as CAD data created by a computer program such as a computer-aided design (CAD) application, as manufacture information (manufacture data) to be used in manufacturing an object.

The manufacturing device 11 receives manufacture data from the information processing device 10 and generates, from the manufacture data, a plurality of sets of cross-sectional information, i.e., sliced data representing a cross-sectional shape of a stereoscopic object obtained by cutting or slicing the object at given spacing. Based on the generated sliced data, the manufacturing device 11 forms and adds a layer upon a layer to manufacture an intended stereoscopic object.

Meanwhile, the manufacturing system is not limited to the one including two devices, namely, the information processing device 10 and the manufacturing device 11. Alternatively, the manufacturing system can include the manufacturing device 11 incorporating the functions of the information processing device 10. Still alternatively, the manufacturing system can include three or more devices incorporating three or more divided functions of the information processing device 10 and the manufacturing device 11.

The manufacturing device 11 may adopt any manufacturing method as long as it can manufacture stereoscopes objects. Herein, the manufacturing device 11 adopts fused filament fabrication (FFF) as a manufacturing method.

Figure 2:
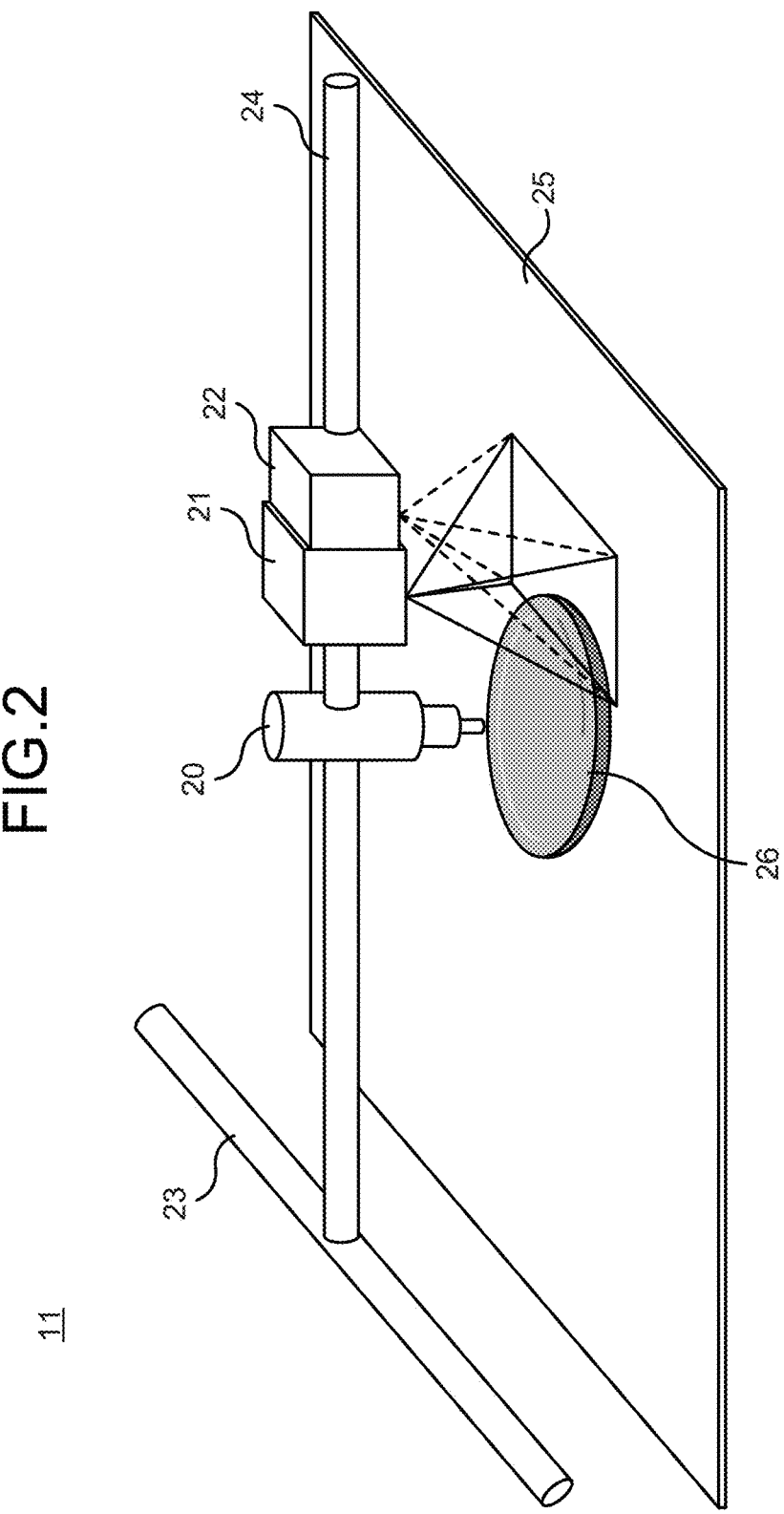
FIG. 2 is a diagram illustrating an exemplary configuration of a manufacturing device.

FIG. 2 is a diagram illustrating an exemplary configuration of the manufacturing device 11. The manufacturing device 11 includes a discharger 20, an output 21, an imager 22, two drive mechanisms 23 and 24, and a controller. The discharger 20 discharges a material (filament) melted for use in manufacturing an object, onto a table 25. The discharger 20 heats a material made of solid-state thermoplastic resin, and discharges the melted (liquid form) or semi-melted (a mixture of solid and liquid) material. The manufacturing device 11 uses the material discharged from the discharger 20 to form and add layers on the table 25 to manufacture an object 26 having a three-dimensional shape.

The output 21 represents a laser light source or a projector and is disposed laterally adjacent to the discharger 20, for displaying a given pattern on the object 26 during manufacturing. The pattern can be of any pattern, and examples thereof include a linear pattern.

In the case of using a laser light source as the output 21, the output 21 emits laser light as pattern light onto the object 26 during manufacturing. The pattern forming by laser emission is referred to as light sectioning. In the case of using a projector as the output 21, the output 21 projects a pattern image onto the object 26 during manufacturing. Pattern forming by pattern projection is referred to as pattern projection.

The imager 22 represents an image sensor such as a charge coupled device (CCD) image sensor or a complementary metal-oxide semiconductor (CMOS) image sensor. The imager 22 generates an image of the object 26 on which a pattern is displayed by the output 21. Then, the imager 22 outputs the generated image of the object 26 as image data. As with the output 21, the imager 22 is placed laterally adjacent to the discharger 20.

The drive mechanism 24 has the discharger 20, the output 21, and the imager 22 attached thereto; and controls the their positions in a horizontal direction (y-direction). The drive mechanism 24 has the discharger 20, the output 21, and the imager 22 attached thereto; and includes a y-direction drive shaft for supporting the elements such as the discharger 20, and a y-direction drive motor for moving the y-direction drive shaft in the y-direction.

The drive mechanism 23 is coupled to the y-direction drive shaft of the drive mechanism 24, and controls the positions of the elements in the horizontal direction perpendicular to the y-direction (i.e., x-direction). The drive mechanism 23 includes an x-direction drive shaft coupled to one end of the y-direction drive shaft, and an x-direction drive motor that moves the x-direction drive shaft in the x-direction.

With such a configuration, the drive mechanisms 23 and 24 that control the discharge position can also serve to control pattern output position and imaging position. Alternatively, a controlling mechanism for the positions of the output 21 and the imager 22 in the x-direction and the y-direction can be independently provided from the drive mechanisms 23 and 24.

The object 26 can be manufactured by repeatedly performing the following operations: forming a layer by moving the discharger 20 with the drive mechanisms 23 and 24 while the discharger 20 discharges the material; lowering the table 25 by one step after the layer is formed; and forming the next layer in the same manner.

Figure 3:
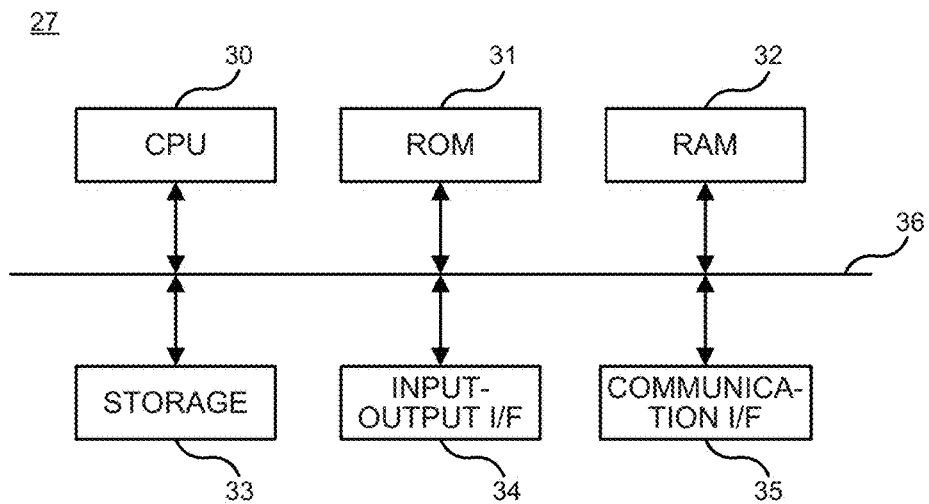
FIG. 3 is a diagram illustrating an exemplary hardware configuration of a controller included in the manufacturing device.

FIG. 3 is a diagram illustrating a hardware configuration of a controller of the manufacturing device 11. A controller 27 includes, as hardware, a central processing unit (CPU) 30, a read only memory (ROM) 31, a random access memory (RAM) 32, a storage 33, an input-output interface (I/F) 34, and a communication I/F 35. The hardware elements are connected to one another via a bus 36, and communicate information with one another.

The CPU 30 executes computer programs for controlling the operations of the manufacturing device 11, and performs given processing. The ROM 31 is a nonvolatile memory and stores computer programs and firmware to be executed by the CPU 30. The RAM 32 is a volatile memory that provides the work area for the CPU 30 to execute computer programs. The storage 33 is a nonvolatile memory that stores a variety of data such as operating system (OS), various applications, setting information, and manufacture data.

Examples of the setting information include kind of a material used in manufacturing, temperature at which the material is to be heated, and discharge speed.

The input-output I/F 34 is connected to the discharger 20, the output 21, and the imager 22 to output control signals to the discharger 20 and the output 21 and receive image data from the imager 22. The communication I/F 35 is connected to the information processing device 10, and controls the communication with the information processing device 10.

Figure 4:
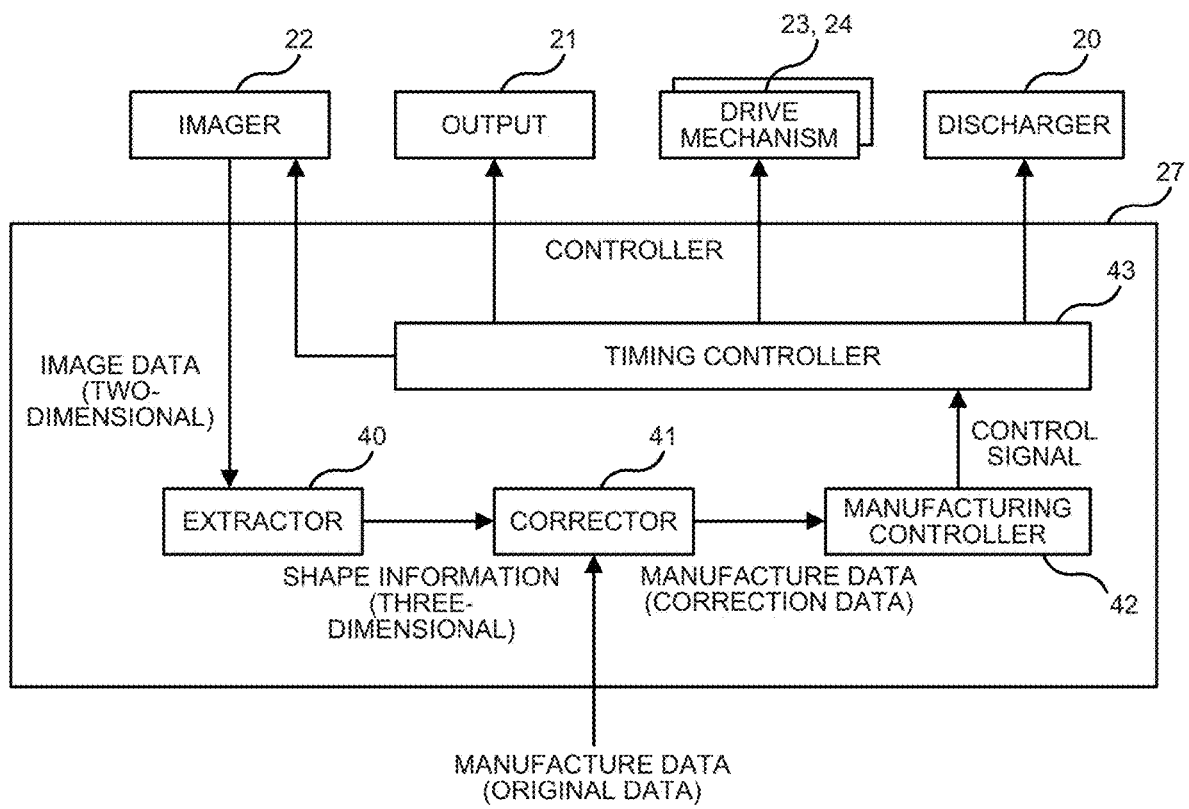
FIG. 4 is a functional block diagram of the manufacturing device.

FIG. 4 is a functional block diagram of the manufacturing device 11. In the manufacturing device 11, the CPU 30 generates functional elements by executing computer programs, and the functional elements implement various functions. For this reason, the manufacturing device 11 includes functional elements for implementing various functions. Herein, the functional elements are implemented by executing computer programs; however, they are not limited thereto. Alternatively, part or all of the functional elements can be implemented by hardware such as circuitry.

The manufacturing device 11 includes an extractor 40, a corrector 41, a manufacturing controller 42, and a timing controller 43 as functional elements.

The extractor 40 acquires the image data from the imager 22. The image data represents the object 26 on which a pattern is displayed by the output 21. The extractor 40 extracts three-dimensional shape information of the object 26 from the acquired image data.

The corrector 41 corrects the manufacture data according to the shape information extracted by the extractor 40. The corrector 41 compares the extracted shape information with the manufacture data to detect a positional offset between each point in the design of the object and the corresponding point of the actual object 26. Then, the corrector 41 corrects the manufacture data in accordance with the detected positional offsets to generate correction data.

The manufacturing controller 42 acquires the correction data from the corrector 41, and converts the correction data into sliced data. Based on the sliced data, the manufacturing controller 42 generates a control signal serving to control the position and amount of discharge. The timing controller 43 receives a control signal from the manufacturing controller 42, and outputs the control signal at given timing to the discharger 20 and the drive mechanisms 23 and 24.

In forming the first layer, no layer is on the table, so that the corrector 41 sets a correction amount to zero and outputs the manufacture data to the manufacturing controller 42. Thus, the manufacturing controller 42 generates a control signal according to the manufacture data, and the discharger 20 and the drive mechanisms 23 and 24 form a first layer in accordance with the control signal.

After the first layer is formed, the object 26 being manufactured is present on the table 25. The output 21 displays a pattern on the object 26, and the imager 22 generates an image of the object 26. Then, the extractor 40 extracts the shape information of the object 26 from the image data output from the imager 22, and the corrector 41 corrects the manufacture data based on the extracted shape information. Then, the manufacturing controller 42 generates a control signal from the corrected manufacture data (correction data); and the discharger 20 and the drive mechanisms 23 and 24 form a second layer in accordance with the control signal. The same operations are repeated until the last layer is formed.

Positional offsets are detected from three-dimensional shape information, which enables more accurate data correction. Positional-offset detection and correction-data generation can be implemented by various algorithms. The following will describe an exemplary correction-data generation method based on differences.

Figure 5:
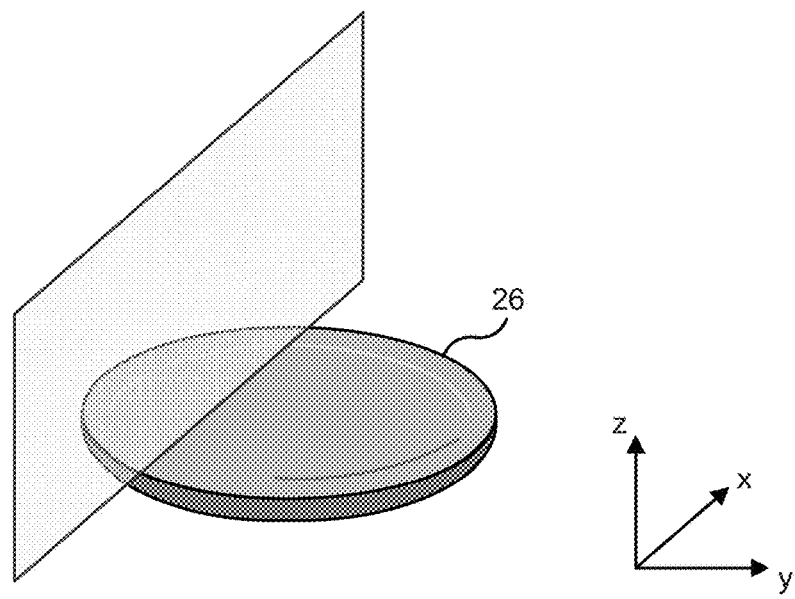
FIG. 5 is a diagram illustrating the state of an object after a layer is formed.

FIG. 5 is a diagram illustrating the state of the object 26 after a layer is formed. FIG. 5 illustrates the state of the object 26 in the x-z plane for the purpose of explaining the correction along the height of the object 26.

Figure 6:
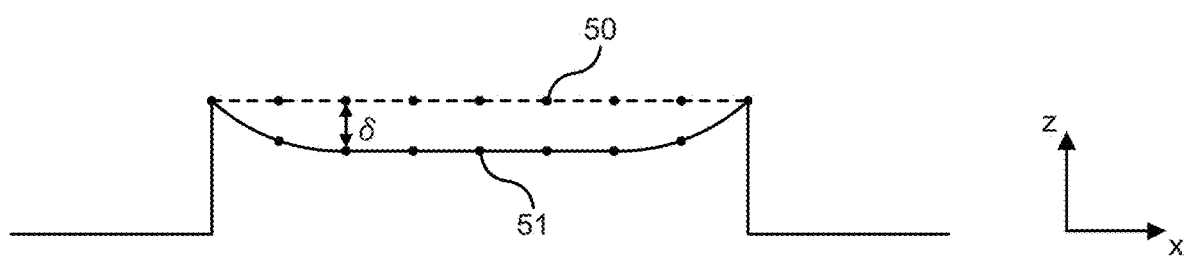
FIG. 6 is a diagram illustrating a positional offset at each extracted point of the object.

FIG. 6 is a cross-sectional view of the object 26 in the x-z plane illustrated in FIG. 5, illustrating the positional offsets between extracted points in first three-dimensional information and corresponding extracted points in second three-dimensional information. The first three-dimensional information represents the manufacture data, and the second three-dimensional information represents the shape information extracted by the extractor 40. In FIG. 6, a dashed line represents the shape acquired from the first three-dimensional information, and optional points on the outer periphery are set to extracted points 50. A solid line represents the shape of the actually manufactured object 26, and points on the outer periphery thereof corresponding to the extracted points 50 are set to extracted points 51. The difference between the extracted points 50 and 51 represents a positional offset δ that is caused by contraction of the fused material which occurs when cooled and hardened.

Figure 7:
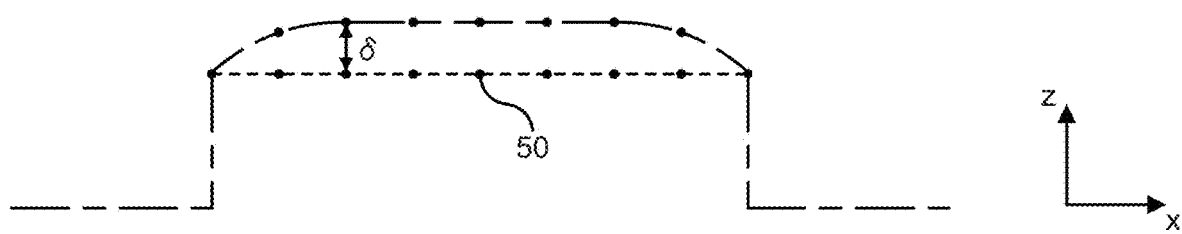
FIG. 7 is a diagram for explaining the correction amount along the height.

FIG. 7 is a diagram for explaining the correction amount in the height direction. As illustrated in FIG. 7, the positional offset δ occurs in negative direction with reference to the shape obtained from the first three-dimensional information indicated by the dashed line. In this case, the positional offset δ can be corrected by adding the amount equal to the positional offset to the shape in positive direction.

Thus, the positional offset $Z\Delta[n]$ can be defined as a difference formula by the following Equation 1:

$$Z\Delta[n]=Zb[n]-Za[n] \quad (1)$$

where $Za[n]$ represents the height of an extracted point [n] in the first three-dimensional information and $Zb[n]$ represents the height of an extracted point [n] in the second three-dimensional information.

The correction amount at each extracted point can be expressed by $-K \times Z\Delta[n]$ where K represents an amplification parameter for controlling the amount of material discharge. The amplification parameter K can be pre-defined according to the characteristics of the manufacturing device 11 and the deformational characteristics at the material. Manufacture data $Z\_h[n]$ along the height taking into consideration the correction amount at each extracted point can be defined using the correction amount by Equation 2 below:

$$Z\_h[n]=Za[n]-K \times Z\Delta[n] \quad (2)$$

Figure 8:
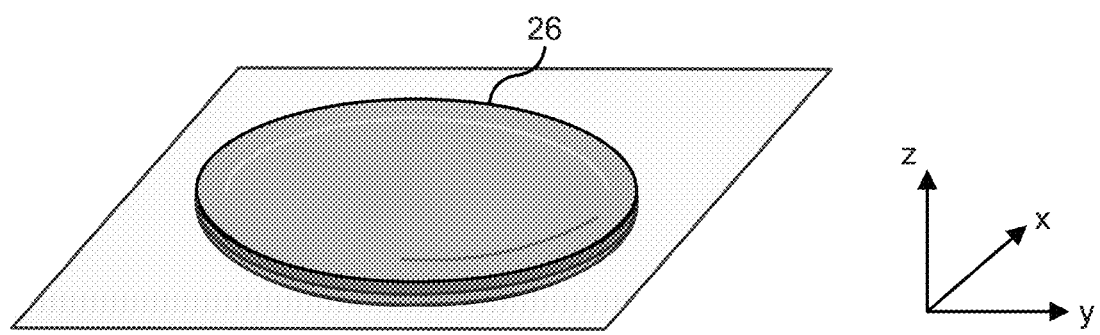
FIG. 8 is a diagram illustrating the state of the object after a layer is formed.

FIG. 8 is a diagram illustrating the state of the object 26 after a layer is formed. FIG. 8 illustrates the state of the object 26 in the x-y plane for explaining the correction in the horizontal direction.

Figure 9:
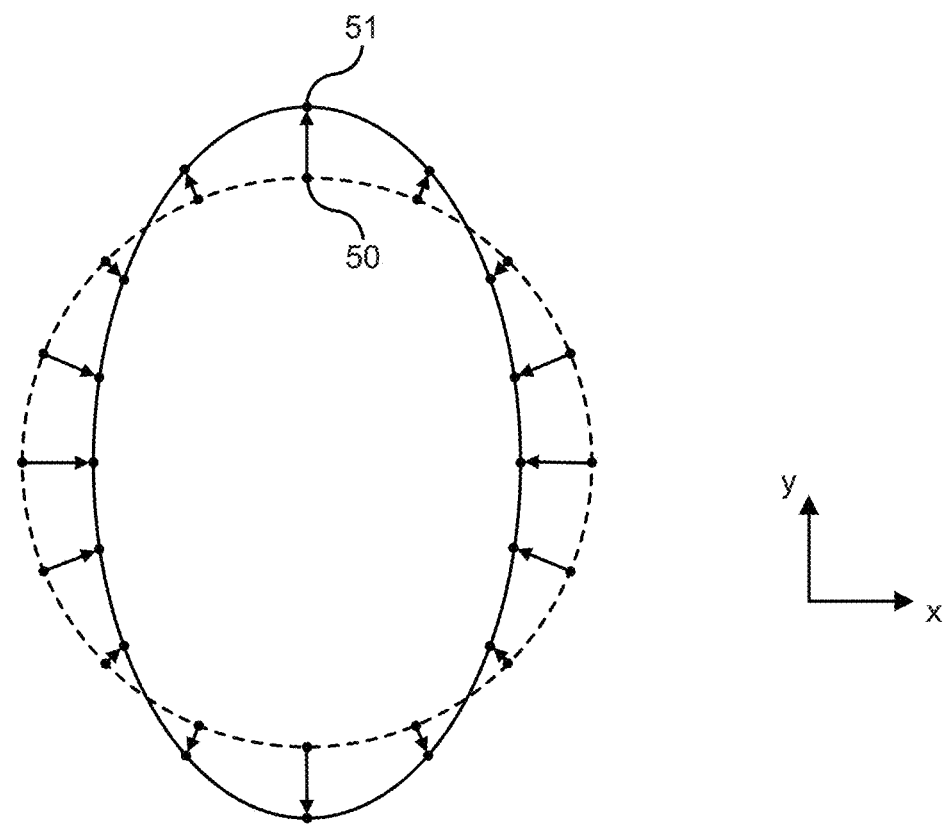
FIG. 9 is a diagram illustrating a positional offset at each extracted point of the object.

FIG. 9 is a cross-sectional view of the object 26 in the x-y plane in FIG. 8, illustrating the positional offsets between the extracted points 50 in the first three-dimensional information and the extracted points 51 in the second three-dimensional information. The first three-dimensional information represents a circular cross-section in the x-y plane while the second three-dimensional information of the actual object 26 represents an elliptical cross-section in the x-y plane with the short axis in the x-direction and the long axis in the y-direction.

Figure 10:
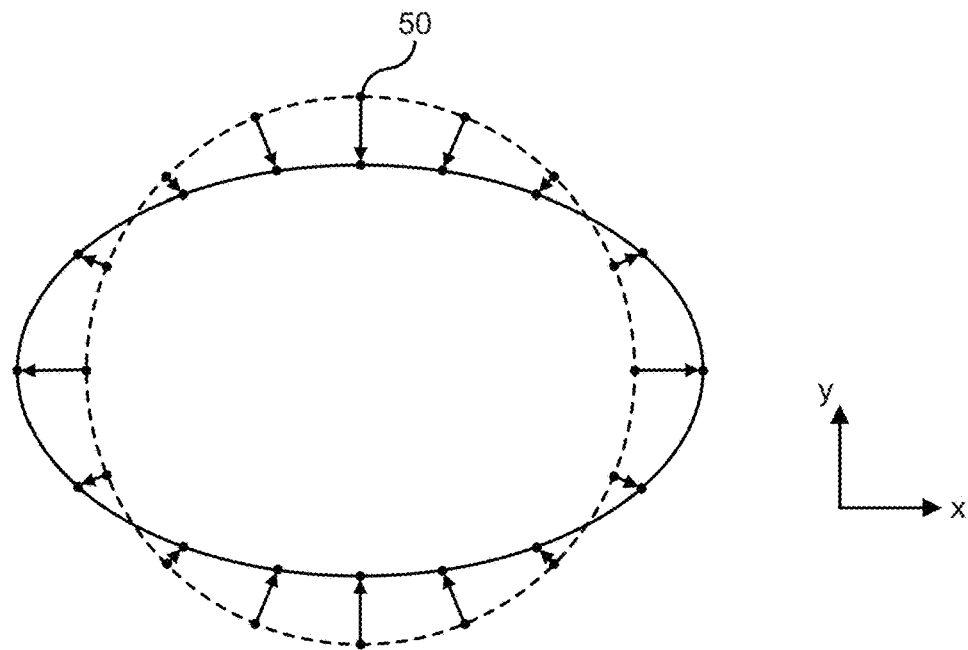
FIG. 10 is a diagram for explaining the correction amount in horizontal direction.

FIG. 10 is a diagram for explaining the correction amount in the horizontal direction. As illustrated in FIG. 10, the shape found from the first three-dimensional information is set to a reference, and the positional offset can be corrected by adding an amount equal to the offset to the shape in the x-direction and subtracting the amount from the shape in the y-direction.

Thus, the positional offset $P\Delta(x, y)[n]$ at the extracted point [n] can be defined as a difference formula by the following Equation 3:

$$P\Delta(x,y)[n]=Pb(x,y)[n]-Pa(x,y)[n] \quad (3)$$

where $Pa(x, y)[n]$ represents the positional coordinates of the extracted point [n] in the first three-dimensional information and $Pb(x, y)[n]$ represents the positional coordinates of the extracted point [n] in the second three-dimensional information.

The correction amount at each extracted point can be expressed by $-\alpha(\alpha x, \alpha y) \times P\Delta(x, y)[n]$ where a vector coefficient $\alpha(\alpha x, \alpha y)$ represents an amplification parameter for controlling the discharge position. The vector coefficient can be pre-defined according to the characteristics of the manufacturing device 11 and the deformational characteristics of the material. Manufacture data P_h(x, y) [n] in the x-y plane taking into consideration the correction amount at each extracted point can be represented using the correction amount by Equation 4 below:

$$P\_h(x,y)[n]=Pa(x,y)[n]-\alpha(\alpha x,\alpha y)\times P\Delta(x,y)[n] \quad (4)$$

Thus, acquiring the information as three-dimensional data during manufacturing as appropriate makes it possible to extract positional offsets in the object 26 from the acquired data, and manufacture the object 26 while correcting the manufacture data.

The following will describe a method of generating the second three-dimensional information as the method for acquiring the information during manufacturing. For generation of the second three-dimensional information, the imager 22 generates an image of the object 26 on which a pattern is displayed by the output 21 to create image data. Shape information is then extracted from the image data.

Figure 11:
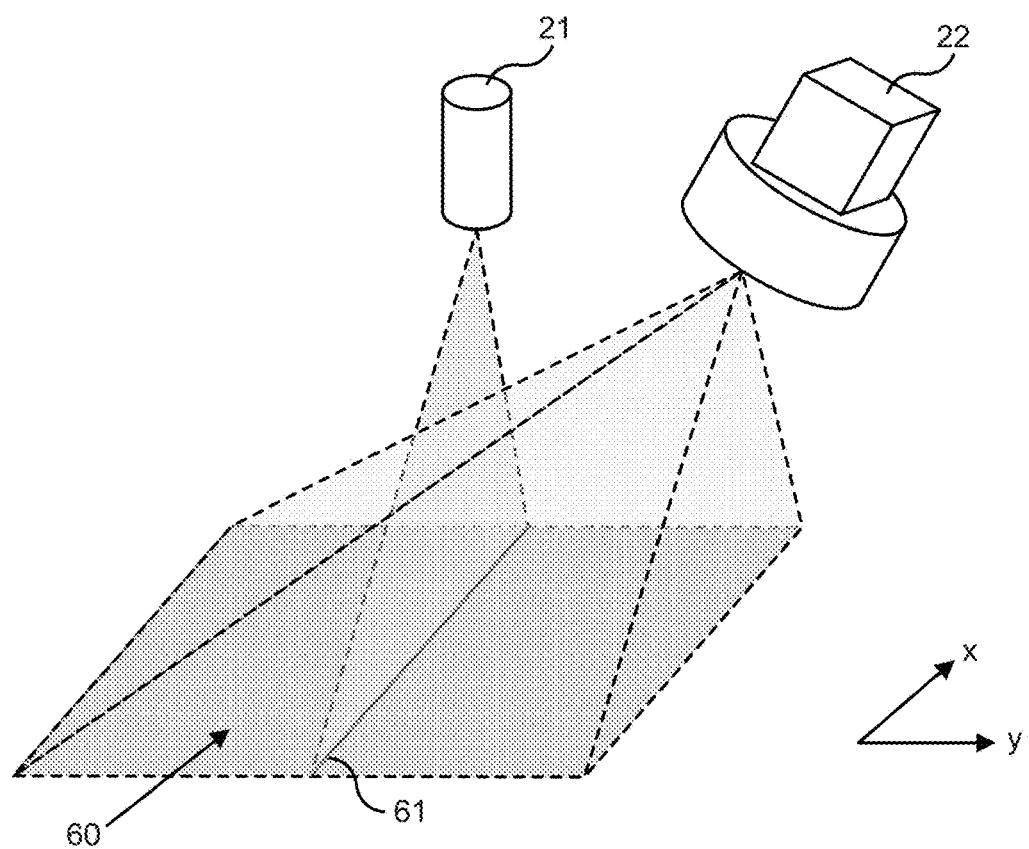
FIG. 11 is a diagram illustrating laser light emission and imaging by light sectioning when there is no intended object.
Figure 12:
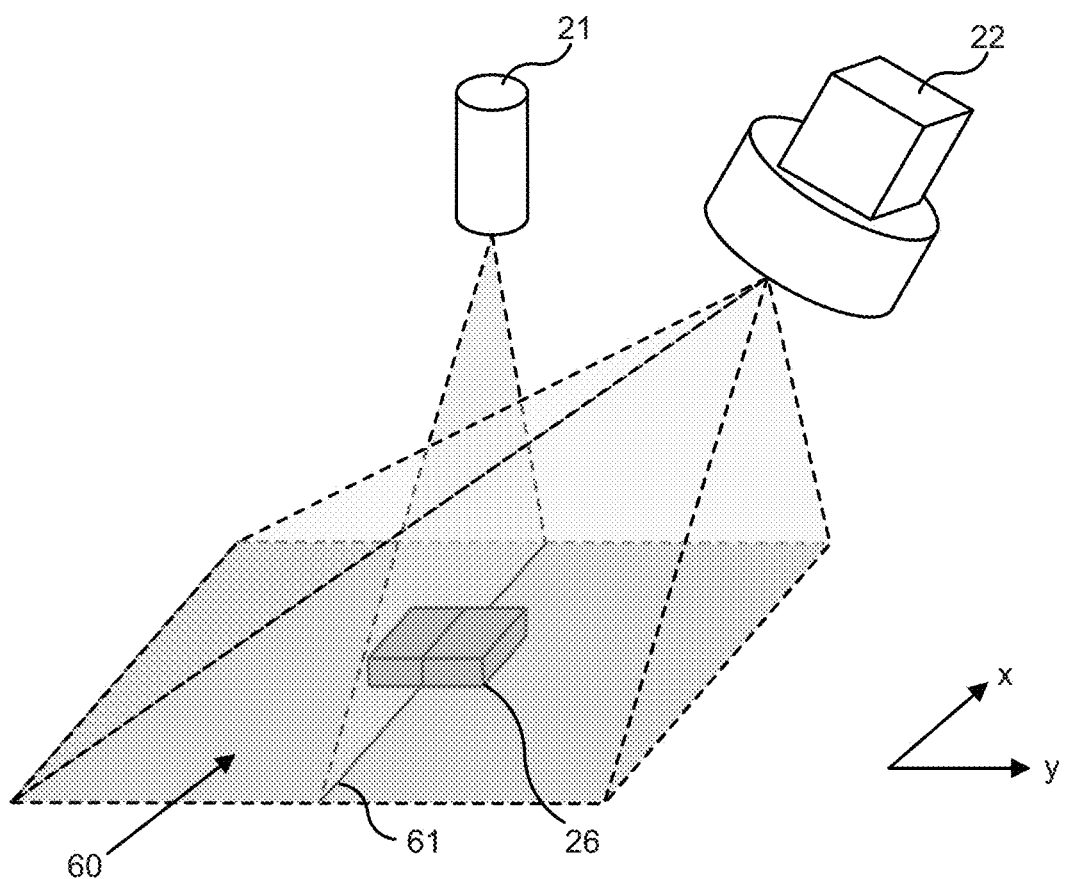
FIG. 12 is a diagram illustrating laser light emission and imaging by light sectioning when an intended object is present.

With reference to FIGS. 11 and 12, light sectioning is described. In the light sectioning, a laser light source is used as the output 21 to irradiate an output area 60 including an intended object with laser light and display a fine linear pattern 61 formed by the laser light. The example in FIG. 11 illustrates that there is no intended object, therefore, the pattern 61 of a linear form is displayed in the output area 60.

The example in FIG. 12 illustrates that the object 26 is present so that the fine linear pattern 61 is displayed along the outer periphery of the object 26. The imager 22 is tilted at a certain angle to image the object 26 and generate image data. Such image data represents a fine linear shape in accordance with the shape of the object 26 along the height.

Figure 13A:
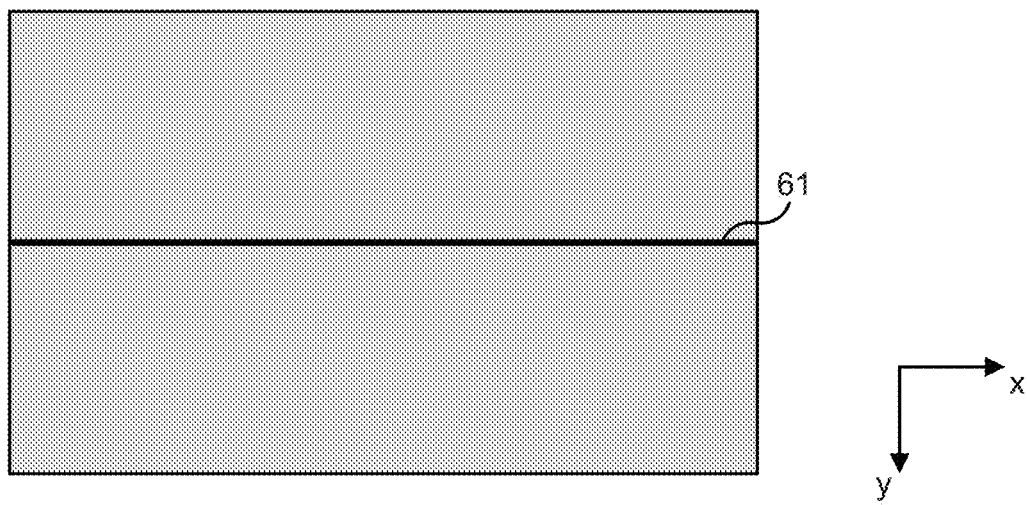
FIGS. 13A and 13B are diagrams illustrating exemplary image data generated by light sectioning.
Figure 13B:
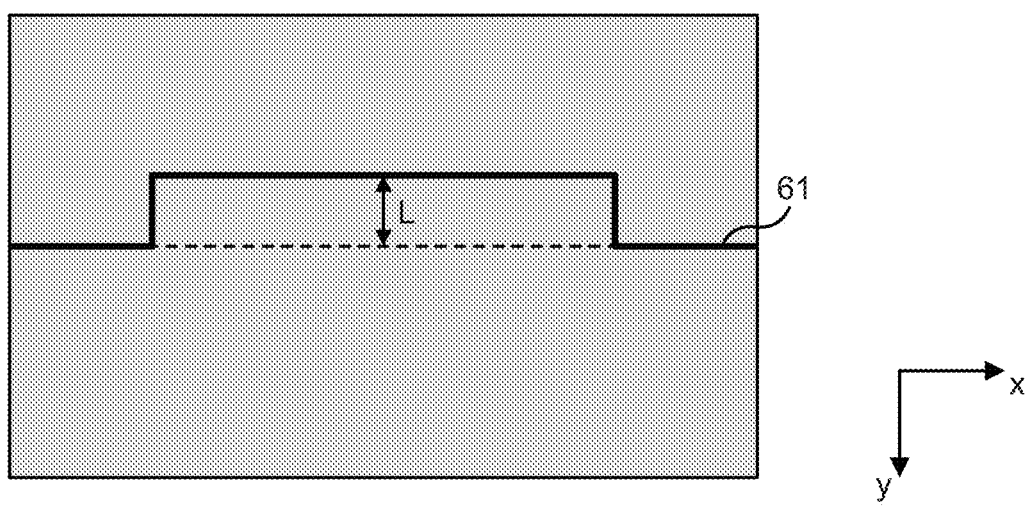

FIGS. 13A and 13B illustrate image data when there is no object 26 and when the object 26 is present. In comparison with the fine linear pattern 61 in the case of no object 26 as illustrated in FIG. 13A, the extending direction and the position of the fine line changes because of the presence of the object 26 as illustrated in FIG. 13B. Hence, it is possible to find the amount of change of the fine linear part changed along with the object 26. The amount of change can be calculated as a distance L from the reference.

Figure 14:
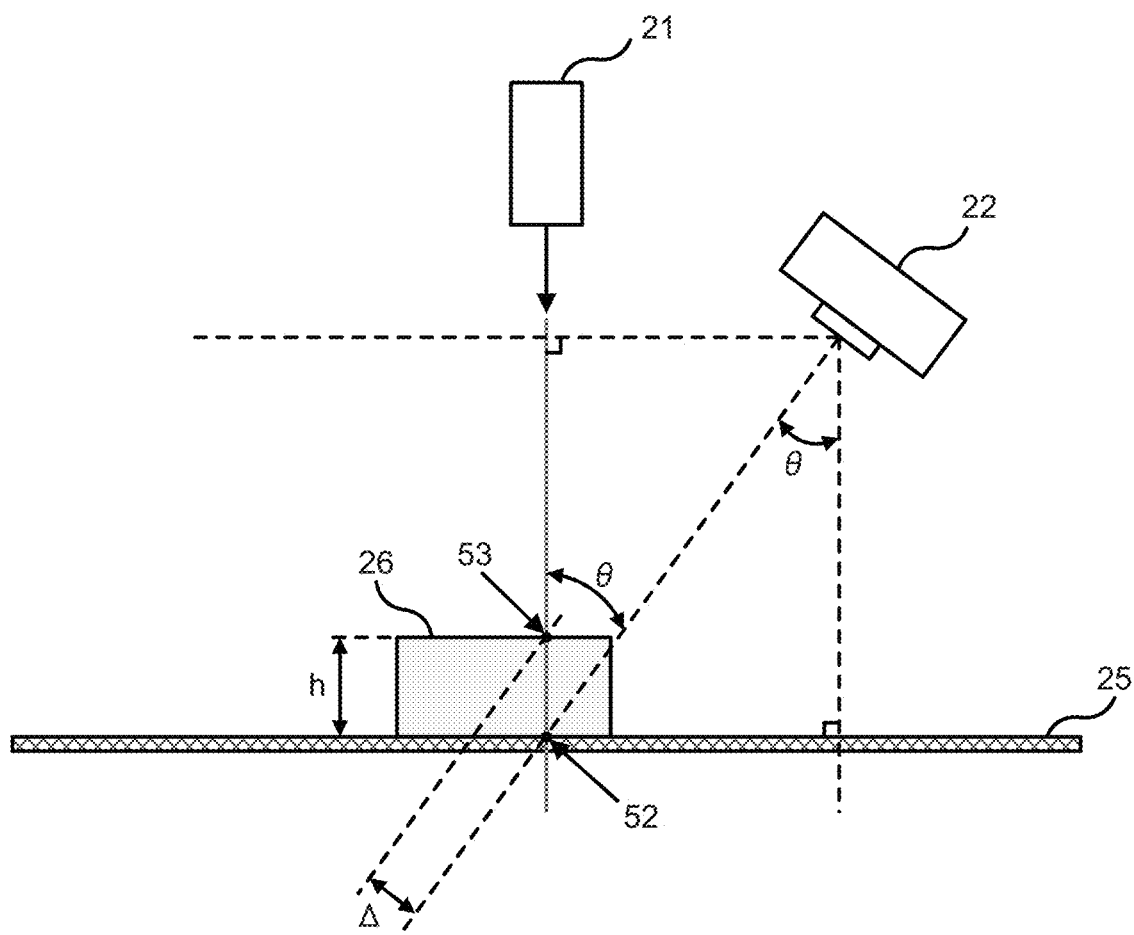
FIG. 14 is a diagram for explaining a method for calculating the height of the intended object.

With reference to FIG. 14, a method of calculating the height of the object 26 as the shape information is described. A height h of the object 26 can be calculated from the angle between the output 21 and the imager 22, the distance from the reference on the image, and the amount of change.

The angle represents an angle θ between a first straight line connecting the light emission point of the output 21 and a point 52 on the table 25 receiving the light, and a second straight line connecting the center of the image sensor of the imager 22 and the point 52. The distance from the reference on the image represents a distance Δ between the second straight line and a third straight line parallel to the second straight line and passing an intersection 53 between the outer periphery of the object 26 and the first straight line.

The height h(x[n]) of the object 26 at an x-directional pixel x[n] corresponding to the point 52 can be calculated by the following Equation 5:

$$h(x[n]) = \Delta(x[n]) \times \gamma \times \frac{1}{\sin\theta} \quad (5)$$

where γ represents the imaging magnification coefficient of the imager 22, Δ(x[n]) represents the distance in the y-direction from the reference position at the pixel x[n] to the fine linear position on the object 26, and θ represents the angle between the output 21 and the imager 22. In Equation 5, the imaging magnification coefficient γ is found by dividing one pixel size of the output area 60 by one pixel size of the image data.

In the manufacturing device 11, the output 21 and the imager 22 can be moved by the drive mechanism 23 in the x-direction and the drive mechanism 24 in the y-direction while maintaining their structural positional relationship. Hence, the output 21 and the imager 22 can irradiate the object 26 with fine linear-pattern light and generate an image at certain intervals while moving in the y-direction at certain velocity. The manufacturing device 11 can acquire the three-dimensional information of the object 26 by calculating the height h at each pixel in the x-direction on the generated image.

Generation of the second three-dimensional information by light sectioning has been described above. The following will describe a method for generating the second three-dimensional information by pattern projection. Pattern projection is a known stereoscopic-information generation method based on triangulation.

Figure 15A:
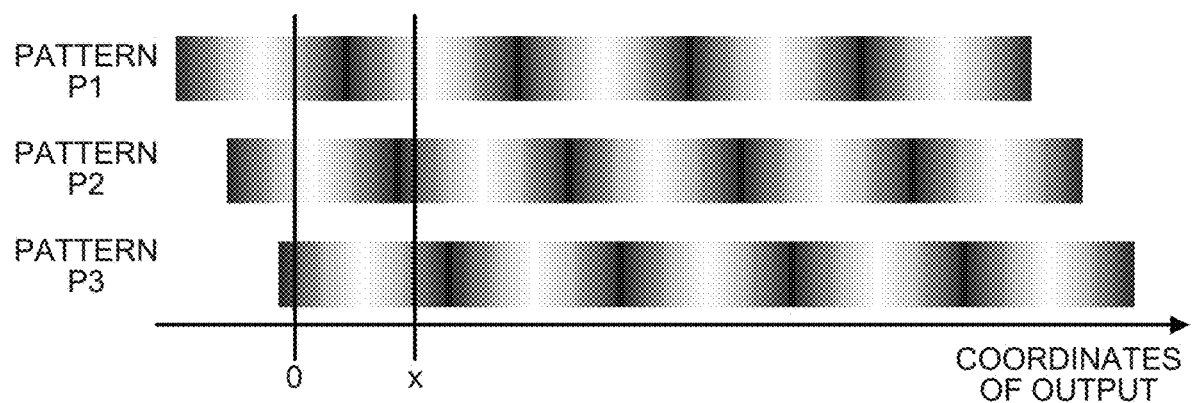
FIGS. 15 and 15B are diagrams for explaining a pattern projection method.
Figure 15B:
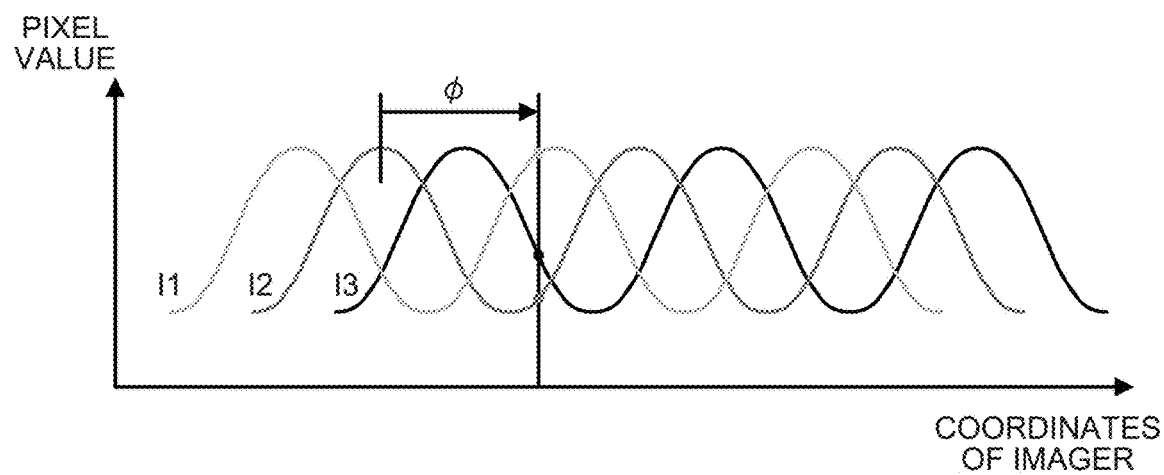

With reference to FIGS. 15A and 15B, a pattern projection method is described. By the pattern projection method, the output 21 projects patterns with sine-wave density variation in the y-direction (i.e., density patterns) onto the output area 60 including the object 26. The density patterns are at least three or more patterns with sine-wave phase shifts. FIG. 15A illustrates three density patterns P1 to P3.

The density patterns P1 to P3 are expressed as wave functions by the following Equations 6:

$$P1=\sin(ky-\tfrac{2}{3}\pi)$$

$$P2=\sin(ky)$$

$$P3=\sin(ky+\tfrac{2}{3}\pi) \quad (6)$$

where k represents a constant number for setting a cycle.

As illustrated in FIG. 15B, density levels I1 to I3 are expressed as sine waves according to the relationship between the coordinates and the pixel values, and they are shifted in phase. Hence, the density levels I1 to I3 can be expressed using wave functions by the following Equations 7:

$$I1=G+A\sin(\phi-\tfrac{2}{3}\pi)$$

$$I2=G+A\sin\phi$$

$$I3+G+A\sin(\phi+\tfrac{2}{3}\pi) \quad (7)$$

where G represents a positional offset component irrespective of pattern projection, and A represents the amplitude of sine waves.

Herein, ky in Equations 6 can be expressed using a value φ found by converting a y-directional position into a phase by the following Equation 8:

$$ky=\phi+2n\pi. \quad (8)$$

Using Equation 7 as a simultaneous equation, G and A are deleted to solve the equation for the value φ, then Equation 8 can be expressed by the following Equation 9:

$$\phi = \tan^{-1}\left\{\frac{\sqrt{3}\times(I1-I3)}{2\times I2-I1-I3}\right\}. \quad (9)$$

As given in Equation 9, the value φ can be expressed by the density levels I1, I2, and I3 of the three-directional phase patterns at each position in the y-direction. Thus, positional information on the pixels can be found as long as the density levels can be calculated.

Figure 16:
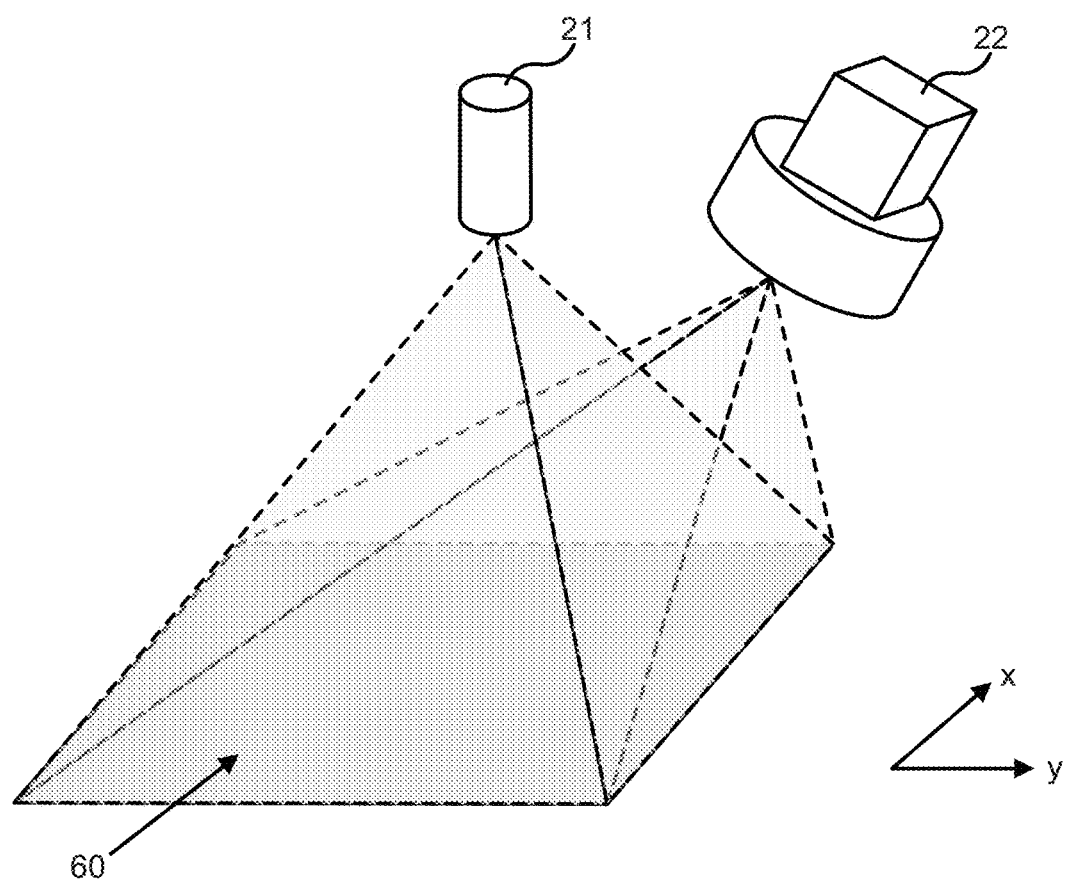
FIG. 16 is a diagram illustrating pattern projection and imaging by pattern projection method when there if no intended object.
Figure 17:
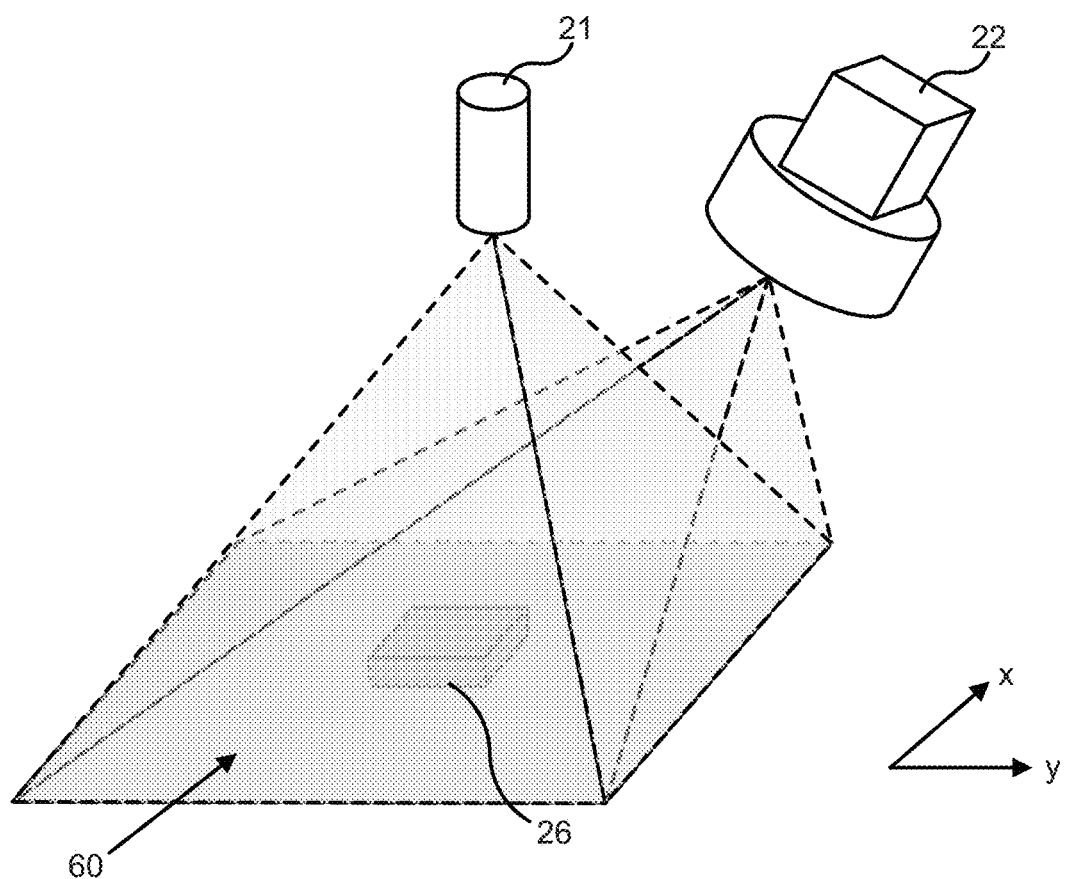
FIG. 17 is a diagram illustrating pattern projection and imaging by pattern projection method when an intended object is present.

FIG. 16 is a diagram illustrating pattern projection and imaging when the object 26 is not present. FIG. 17 is a diagram illustrating pattern projection and imaging when the object 26 having a certain height is present.

With no object 26 present, projected sine-wave density patterns exhibit the same density and appear at regular intervals. Meanwhile, with the object 26 having a certain height present, the sine-wave density patterns projected onto the object 26 exhibit a shape following the outer periphery of the object 26. That is, the patterns move and change in position in only the part where the object 26 is located.

Hence, image data, generated by the imager 22 tilted a certain angle with respect to the output 21, represents the sine-wave density patterns moved in accordance with the shape of the object 26 along the height.

FIG. 18A is a diagram illustrating an exemplary image generated when one of the three density patterns with phase shifts, i.e., the one at one of the phases, is emitted in the absence of the object 26. FIG. 18B is a diagram illustrating an exemplary image generated when the same density pattern in FIG. 18A is emitted in the presence of the object 26. With reference to FIG. 18B, the object 26 is present so that the density pattern moves along with the outer periphery of the object 26.

The three-dimensional information of the object 26 can be found in the following manner. Firstly, a density level D1[x, y] at each pixel position [x, y] is detected in the absence of the object 26. The density level can be calculated by Equations (7) as above.

Then, a density level D2[x, y] at each pixel position [x, y] is detected in the presence of the object 26. The three density patterns with different densities in the y-direction are emitted, so that positional coordinates [x2, y2] are detected from the density level D1[x1, y1] at the pixel position [x1, y1] found in the absence of the object 26 and the density level D2[x1, y1] at the pixel position [x1, y1] found in the presence of the object 26.

Since the density patterns are varied in the y-direction, at each x-directional position satisfying x1=x2, the positional offset Δ[x, y] in the y-direction is calculated by the following Equation 10. The positional offset Δ[x, y] represents information depending on the height of the object 26.

$$\Delta[x, y] = y2 - y1 \quad (10)$$

When the angle θ between the output 21 and the imager 22 is set, as illustrated in FIG. 14, by pattern projection the manufacturing device 11 can calculate the height h[x, y] of an intended object at each pixel position [x, y] from the positional offset Δ[x, y] calculated by Equation 10 in the same manner by light sectioning.

The height h[x, y] of the object 26 can be expressed by the following Equation 11:

$$h[x, y] = \Delta[x, y] \times \gamma \times \frac{1}{\sin\theta} \quad (11)$$

where γ represents an imaging magnification coefficient.

In the manufacturing device 11, as illustrated in FIG. 2, the output 21 and the imager 22 can be moved by the drive mechanism 23 in the x-direction and the drive mechanism 24 in the y-direction while maintaining their structural positional relationship, as illustrated in FIG. 14. Hence, at every interval equal to the output area in the y-direction, the manufacturing device 11 irradiates the object 26 with sine-wave pattern light under at least three phase conditions to be able to calculate the height h[x, y] at each pixel on the generated image data and obtain the three-dimensional information of the object 26.

The three-dimensional information calculated as above is defined as the second three-dimensional information, and the three-dimensional information included in the 3D data of the object is defined as the first three-dimensional information. The manufacturing device 11 manufactures the object while correcting the first three-dimensional information according to the second three-dimensional information, thereby enabling reduction in the offsets and improvement in the accuracy of the manufactured object.

After detecting a positional offset matching or exceeding a threshold value, the controller can terminate the manufacturing process. By terminating the manufacturing process, the manufacturing device 11 can avoid wasting the material and loss of manufacturing time, which would occur in manufacture of a largely defective product.

Manufacturing and correcting by a single manufacturing device 11 has been described above. Alternatively, two or more manufacturing devices 11 having such functions can be used to manufacture an object while mutually communicating correction data. This can further enhance manufacturing quality than use of a single manufacturing device 11. For this purpose, system configuration, control timing, and functional configuration are described below in detail.

Figure 19:
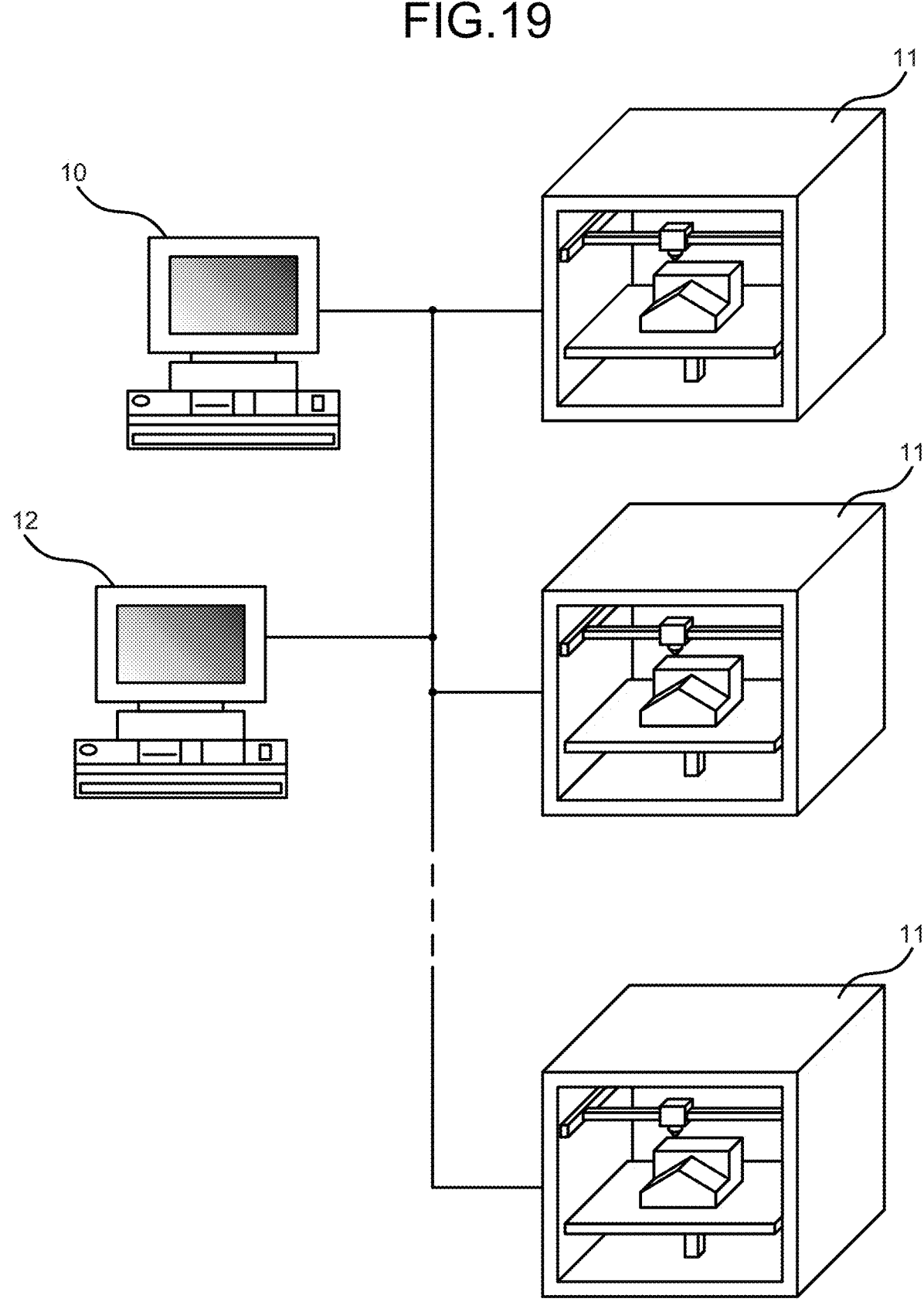
FIG. 19 is a diagram illustrating another exemplary configuration of the manufacturing system.

FIG. 19 is a diagram illustrating another exemplary configuration of a manufacturing system. The manufacturing system includes the information processing device 10, a plurality of manufacturing devices 11, and an information storage device 12 that are connected to one another via a network. The network can be built in a wired manner or a wireless manner. The information processing device 10 and the manufacturing devices 11 have been described above, thus, a description thereof is omitted.

The information storage device 12 includes a storage that stores correction data. In response to a correction-data request from any of the manufacturing devices 11, the information storage device 12 provides the requested correction data to the manufacturing device 11.

Although the manufacturing system includes a plurality of manufacturing devices 11; for ease of explanation, the manufacturing system is assumed to include two manufacturing devices 11. The functions of each manufacturing device 11 are explained. Hereinafter, the two manufacturing devices 11 are referred to as a manufacturing device 1 and a manufacturing device 2.

The manufacturing device 2 manufactures a final object. Thus, the object manufactured by the manufacturing device 2 is defined as an intended object.

The manufacturing device 1 manufactures an object the same as the intended object for the purpose of acquiring the correction data for use in manufacturing the intended object by the manufacturing device 2. The object manufactured by the manufacturing device 1 is defined as a preparatory object.

Figure 20:
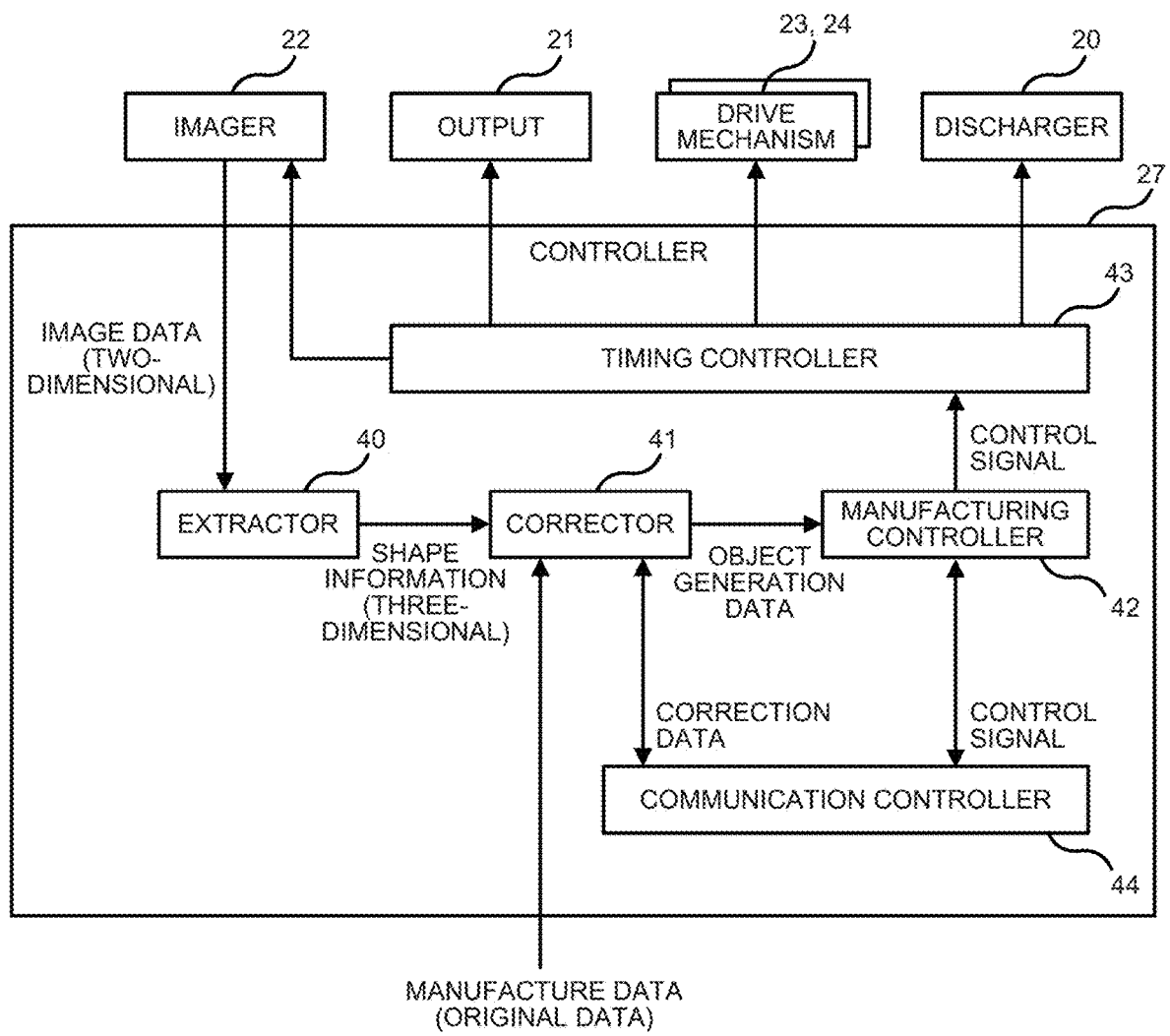
FIG. 20 is a functional block diagram of the manufacturing device.

FIG. 20 is a functional block diagram of the manufacturing device. In each manufacturing device, the CPU 30 executes computer programs to generate functional elements and implement various functions with the functional elements. For this reason, the manufacturing device includes functional elements that implement various functions. Herein, although the functional elements are implemented by execution of computer programs as an example, the present embodiment is not limited to such an example.

Alternatively, part or all of the functional elements can be implemented by hardware such as circuitry. The manufacturing devices 1 and 2 have the same configuration, therefore, the manufacturing device 1 alone is described below.

As with the example illustrated in FIG. 4, the manufacturing device 1 includes the extractor 40, the corrector 41, the manufacturing controller 42, and the timing controller 43 as functional elements. In this example, the manufacturing device 1 further includes a communication controller 44. The extractor 40, the corrector 41, the manufacturing controller 42, and the timing controller 43 have been described, thus, a description thereof is omitted.

The communication controller 44 transmits and receives the correction data to and from the other manufacturing devices 11, and controls communication timing with the other manufacturing devices 11. Thus, the communication controller 44 exchanges the correction data with the corrector 41, and exchanges control signals for use in the timing control with the manufacturing controller 42. The communication controller 44 also communicates with the information storage device 12 to acquire the correction data from the information storage device 12 as necessary.

More specifically, manufacturing an object with the manufacturing devices 1 and 2 is explained. The manufacturing devices 1 and 2 have the same functional configuration, and the functional elements are denoted by the same reference numerals. Hence, the reference numerals are omitted herein.

Firstly, the operation of the manufacturing device 1 is described. In the manufacturing device 1, the corrector generates object creation data for use in object creation, without using correction data, and outputs the object creation data to the manufacturing controller. The object creation data is generated from the manufacture data.

The manufacturing controller converts the object creation data into sliced data for forming layers to become the preparatory object, and generates a control signal serving to control the position and amount of the discharge on the basis of the sliced data. The timing controller receives the control signal from the manufacturing controller, and outputs it to the discharger, the drive mechanism in the x-direction, and the drive mechanism in the y-direction at given timing. Thereby, the discharger discharges the material to form layers to become the preparatory object.

After forming the layers to become the preparatory object, the manufacturing controller controls the imager, the output, and the two drive mechanisms so that the imager generates image data of the formed layer, to acquire the image data. The pattern display method by the output regarding the formed layers may be either light sectioning or pattern projection. Then, the extractor generates the second three-dimensional information on the basis of the image data.

The corrector detects offsets in an actual manufactured object with reference to the generated second three-dimensional information and the first three-dimensional information of the manufacture data. The corrector generates correction data 1 from the detected offsets and outputs the correction data 1 to the communication controller. Then, the communication controller receives and transfers the correction data 1 to the manufacturing device 2 via the network.

As with the operation described above, the corrector generates object creation data without using the generated correction data 1. Then, the manufacturing controller and the other elements form the next layer to be added on the top of the formed layers as a layer to be part of the preparatory object through the above operations. The manufacturing device 1 repeats such operations to manufacture the preparatory object and generates the correction data 1 on each of the layers, and transfers the correction data 1 to the manufacturing device 2.

Figure 21:
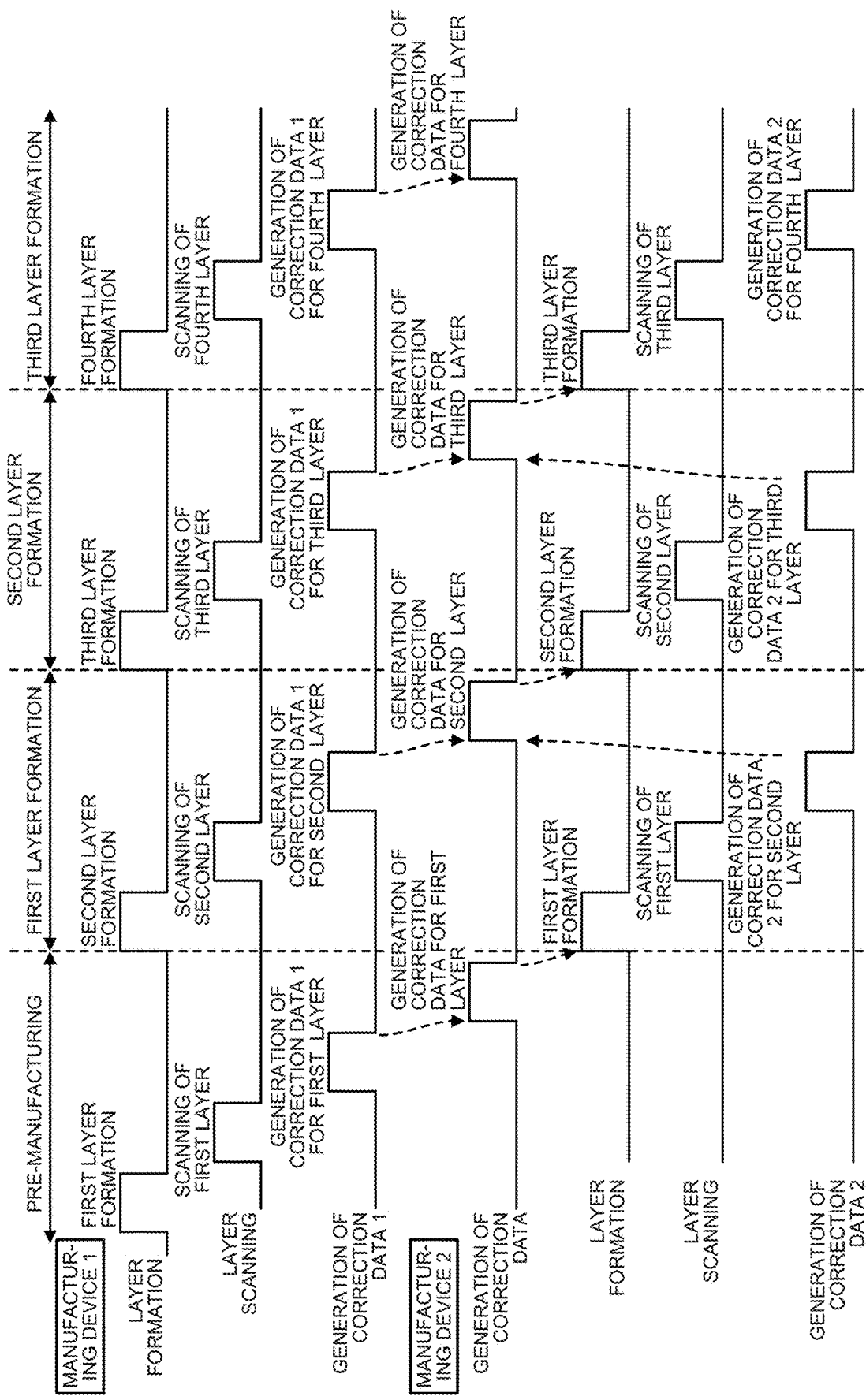
FIG. 21 is a diagram illustrating an example of the control timing of the manufacturing devices.

Next, the operation of the manufacturing device 2 is described. The manufacturing device 2 serves to not only manufacture the intended object but also control manufacturing timing for the manufacturing devices 1 and 2. The operations performed by the manufacturing device 2 are explained with reference to FIG. 21 illustrating the control timing of the manufacturing devices 1 and 2.

Before forming the first layer of the intended object, the manufacturing device 2 instructs the manufacturing device 1 to form the first layer of the preparatory object as pre-manufacturing and generate the correction data 1 of the first layer. In response to the instruction, the manufacturing device 1 starts manufacturing the preparatory object. That is, the manufacturing device 1 forms and scans the first layer, and generates the correction data 1 of the first layer.

After receiving the correction data 1 of the first layer generated by the manufacturing device 1, the corrector of the manufacturing device 2 generates correction data for use in forming the first layer of the intended object from the correction data 1. The corrector generates object creation data for use in forming the first layer of the intended object from the first three-dimensional information of the manufacture data and the generated correction data, and outputs the object creation data to the manufacturing controller.

The manufacturing controller receives and converts the object creation data into sliced data to be used in forming the first layer of the intended object, and generates a control signal serving to control the position and amount of the discharge on the basis of the sliced data. The timing controller receives the control signal from the manufacturing controller and outputs it at given timing to the discharger, the drive mechanism in the x-direction, and the drive mechanism in the y-direction. As a result, the manufacturing unit discharges the material to form the first layer.

At timing at which the first layer is formed, the manufacturing device 2 instructs the manufacturing device 1 to start forming the second layer of the preparatory object and generate the correction data 1 on the second layer.

The manufacturing device 2 controls, after forming the first layer of the intended object, the imager, the output, and the two drive mechanisms so that the imager generates image data of the formed layer, to acquire the image data. The pattern display method by the output regarding the formed layers may be either light sectioning or pattern projection. The extractor generates the second three-dimensional information from the image data.

The corrector detects offsets in the intended object with reference to the generated second three-dimensional information and the first three-dimensional information of the manufacture data. Then, the corrector generates correction data 2 from the detected offsets. The corrector generates correction data to be used in forming the second layer of the intended object from the generated correction data 2 and the correction data 1 of the second layer generated by the manufacturing device 1. The corrector corrects the first three-dimensional information according to the correction data, generates object creation data of the second layer, and outputs the object creation data to the manufacturing controller.

As described above, the manufacturing controller generates a control signal serving to control the position and amount of the discharge of the material to be used in forming the second layer of the intended object, and the timing controller outputs the control signal at given timing. As a result, the second layer of the intended object is formed. The manufacturing device 2 repeats such operations to form the third and subsequent layers and manufacture the intended object.

Thus, the manufacturing device 1 manufactures the preparatory object first, and the manufacturing device 2 reflects the correction data 1 obtained from the manufacturing of the preparatory object to manufacture the intended object. This can improve manufacturing accuracy as compared with manufacturing by a single manufacturing device. This is because a single manufacturing device can merely correct data of a layer to add on the top of the formed layer by estimating the correction from the result of the formed layer. In contrast, two or more manufacturing devices can correct the layer data by reflecting the result of the same layer by another manufacturing device.

The correctors of the manufacturing devices 1 and 2 can calculate the positional offsets by Equation 1 as with a single manufacturing device. The correction amount along the height calculated by the manufacturing device 1 can be expressed as $-K\_1 \times Z\_1\Delta[n]$ while the same by the manufacturing device 2 can be expressed as $-K\_2 \times Z\_2\Delta[n]$. Hence, the manufacture data (object creation data) $Z\_h[n]$ along the height taking into consideration the correction amount at each extracted point can be redefined using the correction amounts from Equation 2 to the following Equation 12:

$$Z\_h[n] = Za[n] - (K\_1 \times Z\_1\Delta[n] + K\_2 \times Z\_2\Delta[n]). \quad (12)$$

Moreover, each correction amount in the x-y plane in the horizontal direction for the manufacturing device 1 can be expressed as $-\alpha\_1(\alpha\_1x, \alpha\_1y) \times P\_1\Delta(x, y)[n]$ and the same for the manufacturing device 2 can be expressed as $-\alpha\_2(\alpha\_2x, \alpha\_2y) \times P\_2\Delta(x, y)[n]$. For this reason, the manufacture data (object creation data) $P\_h(x, y)[n]$ in the x-y plane taking into consideration the correction amount at each extracted point can be redefined using the correction amounts from Equation 4 to the following Equation 13:

$$P\_h(x,y)[n] = Pa(x,y)[n] - (\alpha\_1(\alpha\_1x,\alpha 1y) \times P\_1\Delta(x,y) + \alpha\_2(\alpha\_2x,\alpha\_2y) \times P\_2\Delta(x,y)). \quad (13)$$

By Equations 12 and 13, the positional coordinates at each extracted point can be calculated to generate the object creation data.

As described above, in the case of using the two manufacturing devices 1 and 2, the manufacturing device 1 manufactures the preparatory object first. Alternatively, the manufacturing device 1 can manufacture the preparatory object in advance, and generate the correction data 1 on each layer and store it in the information storage device 12. In this case, in manufacturing the intended object, the manufacturing device 2 can acquire the correction data 1 of each layer from the information storage device 12 to manufacture the intended object according to the acquired correction data 1. Thereby, the manufacturing device 2 can attain similar or same effects as both the manufacturing devices 1 and 2.

FIG. 19 illustrates the structure including the information storage device 12. However, the information storage device 12 is omissible in the case of manufacturing the preparatory object and the intended object by the two manufacturing devices 1 and 2. The number of manufacturing devices may be one when the information storage device 12 is provided.

Although the present invention is described above in the form of an embodiment of a manufacturing device, a manufacturing method, and a manufacturing system; the present invention is not limited to the embodiment described above. That is, other embodiments, additions, modifications, or deletions may be made within the scope conceivable by one skilled in the art. Any form of embodiments is considered to be embodied in in the scope of the present invention as long as such embodiments attain the functions and effects of the present invention.

According to one aspect of the present invention, it is possible to improve accuracy and efficiency of stereoscopic-object manufacturing.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A manufacturing device configured to manufacture a stereoscopic object on the basis of manufacture information, the manufacturing device comprising:
   processing circuitry configured to
      cause an output to display a pattern on a stereoscopic object during manufacturing;
      cause an imager to generate an image of the stereoscopic object on which the pattern is displayed; and
      cause the manufacturing device to correct the manufacture information in accordance with shape information of the stereoscopic object based on the generated image by
         determining a vertical offset, in a geight direction, based on the shape information and the manufacture information, and
         determining a horizontal offset, in a horizontal direction relative to the height direction, based on the shape information and the manufacture information.

2. The manufacturing device according to claim 1, wherein the processing circuitry is further configured to:
   cause the output to emit light of the pattern to the stereoscopic object.

3. The manufacturing device according to claim 1, wherein the processing circuitry is further configured to:
   cause the output to project the pattern onto the stereoscopic object.

4. The manufacturing device according to claim 1, wherein the processing circuitry is further configured to cause the manufacturing device to determine the vertical offset and the horizontal offset by:
  comparing the shape information with the manufacture information to calculate a positional offset at each point on the stereoscopic object, the shape information being extracted from the image generated by the imager; and
  correcting the manufacture information on the basis of the calculated positional offset.

5. The manufacture device according to claim 4, wherein the processing circuitry is further configured to cause the manufacture device to:
  terminate manufacturing of the stereoscopic object in response to the positional offset being equal to or greater than a threshold value.

6. The manufacturing device according to claim 1, wherein the image includes three-dimensional shape information.

7. The manufacturing device according to claim 1, further comprising:
  a communication controller configured to communicate with another manufacturing device, wherein
  the processing circuitry is further configured to control timing at which the another manufacturing device performs a manufacturing process via the communication controller.

8. The manufacturing device according to claim 7, wherein the processing circuitry is further configured to:
  cause the communication controller to acquire as correction information, second manufacture information corrected by the another manufacturing device;
  cause the manufacturing device to correct the manufacture information on the basis of the correction information; and
  cause the manufacturing device to correct the shape information of the stereoscopic object based on the image.

9. The manufacturing device according to claim 1, further comprising
  a communication controller configured to communicate with an information storage device, the information storage device storing correction information for use in correcting the manufacture information, wherein
  the processing circuitry is further configured to
    cause the communication controller to acquire the correction information from the information storage device, and
    correct the manufacture information on the basis of the correction information and the shape information of the stereoscopic object based on the image.

10. The manufacturing device according to claim 1, further comprising
  a communication controller configured to communicate with another manufacturing device, wherein
  the processing circuitry is further configured to cause the communication controller to transmit, to the another manufacturing device, the corrected manufacture information.

11. A manufacturing system configured to manufacture a stereoscopic object on the basis of manufacture information, the manufacturing system comprising:
  processing circuitry configured to
    cause an output to display a pattern on the stereoscopic object during manufacturing;
    cause an imager to generate an image of the stereoscopic object on which the pattern is displayed; and
    cause the manufacturing system to correct the manufacture information in accordance with shape information of the stereoscopic object based on the generated image by
      determining a vertical offset, in a height direction, based on the shape information and the manufacture information, and
  determining a horizontal offset, in a horizontal direction relative to the height direction, based on the shape information and the manufacture information.

12. A manufacturing system comprising:
  the manufacturing device according to claim 1; and
  an information processing device configured to transmit manufacture information to the manufacturing device, the manufacture information manufacturing a stereoscopic object.

13. A method to be executed by a manufacturing device for correcting manufacture information to be used in manufacturing of a stereoscopic object, the manufacturing device comprising processing circuitry, an output, and an imager, the method comprising:
  displaying a pattern on the stereoscopic object during manufacturing;
  generating an image of the stereoscopic object on which the pattern is displayed; and
  correcting the manufacture information in accordance with shape information of the stereoscopic object based on the generated image by
    determining a vertical offset, in a height direction, based on the shape information and the manufacture information, and determining a horizontal offset, in a horizontal direction relative to the height direction, based on the shape information and the manufacture information.

14. The manufacturing device according to claim 1, wherein the processing circuitry is further configured to cause the manufacturing device to determine the vertical offset by determining a difference between a height of an extracted point in the manufacture information and a height of a corresponding extracted point in the shape information.

15. The manufacturing device according to claim 14, wherein the processing circuitry is further configured to cause the manufacturing device to determine a correction amount at the extracted point in the manufacture information based on the vertical offset and an amplification parameter.

16. The manufacturing device according to claim 15, wherein the amplification parameter is based on at least one of characteristics of the manufacturing device or deformational characteristics of a material of the stereoscopic object.

17. The manufacturing device according to claim 1, wherein the processing circuitry is further configured to cause the manufacturing device to determine the horizontal offset according to a difference between positional coordinates of an extracted point in the manufacture information and positional coordinates of a corresponding extracted point in the shape information.

18. The manufacturing device according to claim 17, wherein the processing circuitry is further configured to cause the manufacturing device to determine a correction amount at the extracted point in the manufacture information based on the horizontal offset of the respective point and an amplification parameter.

* * * * *